United States Patent Office 2,813,025
Patented Nov. 12, 1957

2,813,025

METHOD OF MAKING PROTEIN FOOD PRODUCT AND THE RESULTING PRODUCT

Mortimer Louis Anson, New York, N. Y., and Morton Pader, West Englewood, N. J., assignors to Lever Brothers Company, New York, N. Y., a corporation of Maine No Drawing. Application May 14, 1954, Serial No. 429,982

9 Claims. (Cl. 99—14)

The present application is in continuation-in-part of our co-pending application Serial No. 304,844 filed August 16, 1952, now Patent No. 2,739,923.

The present invention relates to protein food products which resemble meat and meat products from the standpoint of taste, texture, general appearance and nutritional value and to a method of making such products.

A process for making simulated meat or simulated meat products from animal and vegetable proteins which are capable of being formed into filaments, such as casein and oilseed proteins, has been proposed in British Patent No. 699,692. In the process described in that patent an aqueous alkaline protein solution is spun or extruded in conventional manner through fine orifices into a coagulating bath, usually an acid salt solution, and thereafter an edible substance or binder is applied to the filaments to hold them in position in the final product.

In accordance with the present invention, it has been found that protein filaments of the type described in the aforesaid patent can be made into food products which more closely resemble meat and meat products by utilizing a chewy protein gel as a binder for the filaments. Such products are made by applying to the filaments a protein solution or dispersion (hereinafter termed "gel precursor") which is capable of forming a chewy protein gel on being heated and thereafter applying sufficient heat to convert the protein solution or dispersion to a chewy gel.

In accordance with the foregoing discoveries, the ultimate product of our invention comprises a heterogeneous assemblage of protein filaments bound together by a chewy protein gel.

In the preparation of protein filaments for use in the product of the present invention, any of the alkaline protein solutions used in the art for the preparation of such filaments can be used. Similarly, any of the known and conventional solutions may be used for coagulating the spun or extruded streamlets of protein, provided such solution is compatible with the subsequent use of the filaments in food products. An aqueous solution at or near room temperature containing sodium chloride and acetic acid is very suitable, about 12% by weight of sodium chloride and 2% by weight of acetic acid being preferred. The concentrations of electrolyte may, however, vary between wide limits.

The filaments, upon their emergence from the coagulating solution, may be strengthened by immersion in a hot electrolyte solution. Stretching of the filaments, when desired, may be carried out during the strengthening treatment. An aqueous solution at 60° C. containing sodium chloride and acetic acid, frequently in the same concentrations as in the coagulating solution may, for instance, be used in the strengthening treatment. The filaments are then usually cooled, for example by passing them through an aqueous solution of sodium chloride at or near room temperature.

The pH of the filaments emerging from the coagulating solution is generally below the isoelectric point of the protein. Any subsequent treatment, such as the cooling treatment described, may raise the pH of the filaments to a limited extent but it is usually desirable to raise the pH of the filaments further by treatment with an alkaline agent, such as an aqueous solution of sodium hydroxide, carbonate or bicarbonate before treatment with the gel precursor. A suitable method for adjusting the pH of the filaments is that described in a co-pending application Serial No. 408,029 filed February 3, 1954, to James D. Devey, Gordon Kellam and Alan J. MacFarlane entitled "Improvements in the Manufacture of Protein Filaments," now abandoned. In this step, the pH is usually raised to above 5. As the normal pH of meat is approximately 6, it is not generally desirable to raise the pH much above that value. For peanut protein, for example, a pH range from about 5.2 to about 5.8 is preferred.

Before discussing the invention in further detail, the following definitions are given for terms used in this application:

The term "suspension" is used to mean any system comprising protein and water.

The term "gel precursor," as used herein, refers to a system essentially of protein and water which is capable of forming a chewy protein gel, usually on being heated.

A "chewy protein gel" refers to a system essentially of protein in colloidal dimensions in water which, when pieces of substantial size are chewed in the mouth, has the physical properties of resilience, elasticity and resistance to shear. These properties and others of the gel are included in the more descriptive and inclusive term "chewy." It also preferably has the characteristic of heat irreversibility, i. e., it essentially retains its firmness when subjected to heat, particularly in products which are to be subjected to heat processing or normal cooking conditions prior to consumption. The chewy gel has a hydrated structure and has, in the absence of other substances, a smooth moist taste in the mouth. The pH of the chewy gel is usually near neutrality or slightly below. In appearance the chewy protein gel is smooth and uniform and, unless other materials are present which change its appearance, slices of suitable thinness are transparent or translucent. Other substances such as carbohydrate materials, non-chewy proteins, fats, flavoring materials, coloring materials, vitamins and minerals may be suspended or dissolved in the protein gel or coated on the gel particles.

It is to be understood, of course, that only non-toxic and compatible materials may be combined with the chewy protein gel for the purpose of making food products.

The gel precursor may be prepared from any protein capable of forming a chewy protein gel. Examples of such protein are oilseed proteins, such as peanut and soya bean protein, and casein.

The preparation of the gel precursor involves the substantial separation of the protein from other substances associated with it in the natural product in which it occurs. A peanut or soya meal substantially freed from oil by treatment which leaves the protein readily soluble in dilute alkali, for example by low temperature solvent extraction, might, for instance, be suspended in water and sufficient alkali added to dissolve the protein while leaving undissolved carbohydrates and certain other materials contained in the meal, taking care that the gel inhibitor of the soya protein is removed. The undissolved materials may then be removed by filtration or centrifugation. The protein may then be precipitated from the resultant extract at normal or elevated temperature, for example, by the addition of acid, to adjust the pH of the extract to or near the isoelectric point of the protein. The precipitated protein may then be collected by filtration or centrifugation.

It has been found that certain advantages result if the heat-denaturable protein in a gel precursor is in a denatured, preferably heat-denatured, form. This may be achieved by the application of heat before, during or after the precipitation of the protein from the extract, the system normally being heated to a temperature of at least 50° C., generally no less than about 70° C. and, preferably, within the range of about 85 to 100° C. In a preferred process the extract is heated to and maintained at an elevated temperature for a short time before the precipitating agent is added. The preferred length of time between heating and precipitation is roughly inversely proportional to the temperature, longer at lower temperatures and shorter at higher temperatures; at a temperature of about 95° C., approximately 1 to 5 minutes are sufficient to give excellent results with a typical extract of groundnut protein. Protein precipitated from a heated extract is hereinafter referred to as "hot precipitated protein."

The protein concentration and the pH are the two main factors which determine whether a heat-irreversible gel will be formed from the gel precursor upon the application of heat. The two factors are largely inter-dependent; the lower the concentration, the higher the pH below which satisfactory gel formation does not take place. The protein concentration of a peanut protein gel precursor with which the filaments are to be treated according to the present invention, is usually in a range between about 20 and 30% by weight. A concentration in the vicinity of 25% is preferred.

In preparing the gel precursor, the protein concentration of a precipitate collected as described above varies with the mode and conditions of precipitation but is usually above the required value. A gel precursor may be prepared from the precipitate by dilution with water, conversion of the mixture to as uniform a condition as possible, and adjustment of the pH by the addition of alkali.

At the preferred range of protein concentration, the pH is generally adjusted to a value of about 6 or greater. There has been observed an increase in the tendency of certain samples of protein toward the development of undesirable color and flavor of the gel ultimately obtained, as the pH of the gel precursor is raised. Too high a pH may also lead to a certain undesirable rubberiness. For these reasons and because it is generally desirable to obtain a food product having a pH similar to that of natural meat, it is advisable to keep the pH below about 7.5. The pH value to which the gel precursor is adjusted will also depend to a certain extent on the relative proportions in which filaments and gel precursor are to be mixed and on the pH of the filaments, since the pH of the gel precursor will generally tend to be lowered by the admixture with the filaments. In summary, we prefer a pH of from about 6 to about 7.5.

The same two factors, protein concentration and pH, also determine, in conjunction with others, the characteristics of the gel obtained. Under otherwise similar conditions it has been found that a gel of greater strength is formed the higher the concentration and one of lower strength the higher the pH. Other factors which influence the character of the gel include the nature of the protein used, its history prior to gel formation, the amounts of filaments present and their pH, and the amount and nature of any salt or other additives which may be present.

At the pH values and concentrations normally used, heat precipitated protein gives a more rigid gel precursor than protein precipitated at room temperatures. This greater rigidity is of advantage in the processing of certain products; and in particular it facilitates treatment of the filaments with a relatively high proportion of gel precursor. Accordingly, hot precipitated protein may be preferred for the manufacture of certain types of products and it may also be preferred from the viewpoint of color and flavor of the gel ultimately obtained. In other cases, room temperature precipitated protein may be prepared because it can be gelled more readily at a lower pH.

The extent and direction of the effect which the presence of salts, such as calcium salts, sodium chloride or phosphates, has on gel formation or on the stiffness of any gel obtained depends on the nature and concentration of the salt and on the particular protein used in the gel precursor. Thus, calcium chloride, for instance, may have a more marked effect than sodium chloride. To avoid the possibility of inhibition of gel formation in the case of, for example, peanut protein, it is thought advisable that only small amounts of calcium should be present. Larger amounts may be sequestered by a suitable sequestering agent, such as, for example, sodium citrate. When casein is used to prepare a gel precursor, on the other hand, the presence of an appreciable amount of calcium may actually be desirable to permit the formation of a heat-irreversible gel, particularly when accompanied by the lowering of the pH to a value lower than that generally used with proteins such as peanut protein.

The presence of relatively large amounts of materials associated with the protein in the natural product is undesirable and special care should be taken to remove, as far as is practicable, any materials which may tend to impart undesirable color or flavor to the product of the invention. It is important that peanut protein or other proteins which may contain tannin should be protected against contamination by heavy metals and it is advisable, therefore, to use stainless steel for those parts of the equipment which may come in contact with the protein. Certain additives to the gel precursor, such as fat, may be used to adjust the texture of the gel ultimately obtained.

Depending upon the protein concentration, the pH and the mode of preparation of the gel precursor, the latter may be obtained as a paste or a more or less viscous liquid. The method of treating the filaments with the gel precursor may vary with the physical form of the precursor, the relative proportions of filaments and the precursor and with the type of food product desired. The treatment can comprise gently blending the ingredients, while taking care not to disintegrate the filaments to any undue degree, by hand mixing or by relatively slow speed mechanical means, such as a dough mixer. If the gel precursor is a liquid the filaments may be immersed in it, for instance by passing the uncut filaments continuously through a bath containing the liquid, or the liquid may be sprayed on the filaments.

The proportion of gel precursor to filaments may be varied considerably according to the type of product. In products resembling a cut of meat, such as a pot roast, the proportion may be of the order of 1:2 while in products resembling comminuted meat products, e. g., hamburger, it is usually greater, normally ranging from about 1:1 to 2:1. The filaments may be treated with all the gel precursor in one operation. Alternatively, products according to the invention which resemble pieces of meat may first be prepared and the chopped pieces may then be mixed with additional gel precursor. The mixture can then be heated again.

The heating of the mixture of filaments in gel precursor or of chopped pieces of a product according to the invention with additional gel precursor is carried out at a temperature and for a time sufficient to result in the formation of a chewy protein gel. Heating may be effected, for instance, by exposure to open steam or by placing a vessel containing the mixture into boiling water. Generally, it is preferred to heat to a temperature above 100° C., for instance by heating in an autoclave with steam at super-atmospheric pressure. The time of heating for gel formation depends on the temperature and the thickness of the mixture being heated. With the majority of products, however, it is preferred to prolong the heating so as to assure a sterile product. If desired, heating may be carried out by the ultimate consumer, i. e., the product may be sold simply as a mixture of gel precursor and filament.

Usually, a product according to the invention contains one or more substances in addition to the filaments and the chewy protein gel which substances we herein term "additives." Such substances may be dyes, flavoring materials, fat, starch or flour and may be incorporated to impart color, flavor, texture or other desirable properties to the product. Other additives, such as amino-acids or vitamins, may serve to improve the nutritional value of the products. Any additive incorporated in the product must, of course, be compatible with the use of the product as a food product and, if incorporated before gel formation, must not be such or of such proportion as to interfere with gel formation. The additives may be incorporated in the product by adding them to the protein solution from which the filaments are to be made in which case the additives will be contained in the filaments. Conversely, the additives may be incorporated with the gel precursor or they may be blended as a third phase with the gel precursor and filaments. It is permissible, and often desirable, to add one or more additives at one stage and more of the same additive or additives at different stages of manufacture. The combined amount of chewy protein gel and filaments is preferably such as a give a protein content similar to that of the meat and meat product being simulated.

Widely different products may be obtained by varying the characteristics of the filaments or the gel, the nature and the amount of additives, the relative proportions of the various ingredients and the sequence in which certain of the steps described are carried out. It is thought that the improved texture and appearance of products according to the invention is due, at least in part, to an interaction taking place on gel formation between the surface of the protein filaments and the chewy protein being formed.

The following examples are given to illustrate the invention further and in particular to exemplify different techniques by which various kinds of cooked meats and meat products may be simulated. Parts and percentages are by weight unless otherwise specified.

EXAMPLE 1

Extraction and separation of protein for filaments

A commercial, substantially skin-free, oil-free, low temperature solvent-extracted peanut meal was extracted at pH 7.5 with an aqueous sodium hydroxide solution (1 part meal, 9 parts of 0.03% sodium hydroxide solution). The insoluble residue was removed by centrifuging and the protein was then precipitated from the solution at pH 5.0 by the addition of 10 N hydrochloric acid. The precipitated protein was separated by centrifuging.

Preparation of filaments

The precipitated protein suspension so obtained was dissolved in aqueous sodium hydroxide and the pH of the solution was adjusted to about pH 12.3 by a further addition of sodium hydroxide at which pH the solution was aged for about ten minutes. The pH of the solution was then reduced to about pH 10.8 by the addition of 2 N acetic acid. (An edible dye which will combine with the protein may, if desired, be added to the solution.) The resultant alkaline solution containing about 19% by weight of protein solids was extruded through a battery of six spinnerets (having holes 90 microns in diameter) into a coagulating bath maintained at room temperature which comprised an aqueous solution containing 12% by weight sodium chloride and 2% by weight acetic acid.

Intermediate treatment of filaments

The six bundles of filaments formed in the coagulating bath were amalgamated into one tow which was guided from the coagulating bath into a strengthening bath comprising a solution similar to that of the coagulating bath but maintained at 60° C. During the strengthening treatment which was of about two minutes duration the filaments were stretched to double their initial length. The tow was then guided to another bath comprising an aqueous solution containing 5% by weight sodium chloride and maintained at 20° C. and then through squeeze rollers. The tow was then immersed for 25 seconds in an aqueous solution containing 5% by weight sodium chloride and 1½% sodium bicarbonate. The temperature of this solution was 20° C. After this treatment, the tow was rinsed in cold water to free it from excess bicarbonate and salts. On emergence the pH of the filaments was about 5.5. Finally, the tow was passed through squeeze rollers to reduce its moisture content to between 63 and 70%.

Preparation of gel precursor

The commercial peanut meal was extracted with aqueous hydroxide solution as in the extraction of the protein for the filaments and the insoluble residue was removed by centrifuging. The extract was heated to 95° C. and maintained at that temperature for 5 minutes before sufficient 10 N hydrochloric acid was added to reduce the pH to 5. The precipitated protein was then separated by centrifuging. The protein suspension so obtained, which had a solids content of about 35%, was put through a mincer whose plate had holes of ½ inch in diameter and then through a 16 square/inch sieve. The resultant mass was mixed with sufficient water and sodium hydroxide in a mechanical mixer and mixing was continued until a smooth plastic mass was obtained whose solids content was about 25% and whose pH was 6.9.

Admixture of ingredients

Eight (8) parts by weight water, 40 parts by weight gel precursor and 25 parts by weight of a mixture of Farina, skim milk powder, hydrogenated vegetable oil, diced port fat and flavoring and coloring agents were thoroughly mixed into a slurry. Twenty-five (25) parts by weight of filament tow, chopped into about ½ inch lengths, were then added and the mixture was mixed in as short a time as possible to avoid undue disintegration of the filaments.

Final processing

The mixture was packed into 8-oz. sanitary cans which were sealed immediately. The cans were then placed into an autoclave where they were heated for 2½ hours with steam at a pressure of 10 lbs. per square inch. The cans were then allowed to cool.

The product resembled canned luncheon meat in texture and appearance.

EXAMPLE 2

A product was made in a similar way to that described in Example 1 but the relative proportions of the ingredients were:

| | Parts |
|---|---|
| Water | 30 |
| Gel precursor | 120 |
| Mixture of diverse ingredients | 83 |
| Filaments | 114 |

Part of the product was chopped and another part coarsely minced.

A hundred parts of the chopped product and an equal amount of the minced product were thoroughly mixed with 120 parts gel precursor and 120 parts of a mixture of minced pork, diced pork fat and diverse flavoring agents.

The resultant mixture was used as pie filling, the conversion of the gel precursor, added in the second stage, to a gel taking place during the baking of the pastry. The product resembled a meat pie in taste and texture.

EXAMPLE 3

Separation of protein for gel precursor

A commercial "oil-free" peanut meal, prepared by low temperature solvent-extraction of substantially skin-free nuts, was extracted at pH 8 with aqueous sodium hydroxide solution. The insoluble residue was removed by centrifuging. Sufficient 10 N hydrochloric acid was added to the extract at room temperature to reduce the pH to 5 and the precipitate was separated by centrifuging. The precipitate was then washed twice with cold water. Sufficient water was then added to the precipitate to give a slurry having a solids content of 28 to 30% by weight and the mixture was passed through a colloid mill.

Admixture of ingredients

Five hundred and twenty (520) parts of the slurry so obtained were mixed in a Hobart mixer with 40 parts of mixed flavoring and coloring agents and the pH of the mixture was adjusted to about 7 by the addition of 15% NaOH solution. Twenty (20) parts of hydrogenated vegetable fat, divided into small pieces, were then added with continued stirring. Seven hundred fifty (750) parts of filament tow prepared as in Example 1 and cut into ½ inch lengths, were then mixed with the slurry in a Hobart mixer fitted with a dough arm.

The mixture so obtained was filled into greased aluminum trays, about 1 inch deep. The trays were covered with greased aluminum lids and were then exposed to live steam for about an hour.

The intermediate product so obtained was cut into roughly half inch cubes and 100 grams of these cubes were placed into an 8-oz. unlacquered sanitary can. A beef-extract flavored hot gravy was added to fill the can whereupon the can was sealed immediately. The can was then placed in an autoclave and heated with steam at a pressure of 10 lbs. per square inch for 2 hours. The can was then cooled.

The product resembled canned beef steak in gravy.

It is intended to cover all changes and modifications in the examples of this invention, herein given for purposes of disclosure, which do not depart from the spirit and scope of the appended claims.

We claim:

1. A protein food product resembling meat and meat products comprising a heterogeneous assemblage of protein filaments bound together by a chewy protein gel having a thermostable, unstretched, hydrated, and unoriented structure.

2. A product according to claim 1 in which the chewy protein gel comprises peanut protein.

3. A product according to claim 1 in which the chewy protein gel comprises soya protein.

4. A product according to claim 1 in which the protein filaments are formed by extrusion of a protein solution into an acid coagulating bath.

5. A protein food product which upon heating will resemble meat and meat products comprising a heterogeneous assemblage of protein filaments bound together by a protein gel precursor which is an aqueous dispersion of protein having a protein concentration of from about 20% to about 30% and a pH from about 6 to about 7.5.

6. A method of making a protein food product resembling meat and meat products which comprises applying to a mass of protein filaments an aqueous dispersion of protein having a protein concentration of from about 20% to about 30% and a pH from about 6 to about 7.5.

7. A method of making a protein food product resembling meat and meat products which comprises applying an aqueous dispersion of protein having a protein concentration of from about 20% to about 30% and a pH of from about 6 to about 7.5 to a mass of protein filaments, and heating the resultant mixture to impart chewiness to said dispersion and to bind the filaments together.

8. A method according to claim 6 in which the protein in the dispersion is peanut protein.

9. A method according to claim 6 in which the protein in the dispersion is soya protein.

References Cited in the file of this patent

UNITED STATES PATENTS

| | | |
|---|---|---|
| 670,283 | Kellogg | Mar. 19, 1901 |
| 869,371 | Kellogg | Oct. 29, 1907 |
| 2,560,621 | Wrenshall | July 17, 1951 |
| 2,682,466 | Boyer | June 29, 1954 |

FOREIGN PATENTS

| | | |
|---|---|---|
| 699,692 | Great Britain | Nov. 11, 1953 |

UNITED STATES PATENT OFFICE
CERTIFICATE OF CORRECTION

Patent No. 2,813,025

November 12, 1957

Mortimer Louis Anson et al.

It is hereby certified that error appears in the printed specification of the above numbered patent requiring correction and that the said Letters Patent should read as corrected below.

In the heading to the printed specification, lines 2 and 3, title of invention, for "METHOD OF MAKING PROTEIN FOOD PRODUCT AND THE RESULTING PRODUCT" read --METHOD OF MAKING PROTEIN FOOD PRODUCTS AND THE RESULTING PRODUCT--; column 1, line 17, strike out ", now Patent No. 2,739,923"; column 5, line 23, for "a give a" read --to give a--.

Signed and sealed this 14th day of January 1958.

(SEAL)
Attest:
KARL H. AXLINE
Attesting Officer

ROBERT C. WATSON
Commissioner of Patents